(12) United States Patent
Elliott

(10) Patent No.: US 10,710,503 B2
(45) Date of Patent: Jul. 14, 2020

(54) SYSTEMS AND METHODS FOR STREAMING VIDEO FROM A REAR VIEW BACKUP CAMERA

(71) Applicant: Verizon Patent and Licensing Inc., Arlington, VA (US)

(72) Inventor: Bryant Elliott, Atlanta, GA (US)

(73) Assignee: Verizon Patent and Licensing, Inc., Basking Ridge, NJ (US)

(*) Notice: Subject to any disclaimer, the term of this patent is extended or adjusted under 35 U.S.C. 154(b) by 124 days.

(21) Appl. No.: 15/449,223

(22) Filed: Mar. 3, 2017

(65) Prior Publication Data

US 2018/0251067 A1    Sep. 6, 2018

(51) Int. Cl.
*B60R 1/00* (2006.01)
*H04N 7/18* (2006.01)
*H04N 5/232* (2006.01)
*G08G 1/16* (2006.01)

(52) U.S. Cl.
CPC .............. *B60R 1/00* (2013.01); *G08G 1/168* (2013.01); *H04N 5/23206* (2013.01); *H04N 5/23293* (2013.01); *H04N 7/183* (2013.01); *H04N 7/188* (2013.01); *B60R 2300/207* (2013.01); *B60R 2300/406* (2013.01); *B60R 2300/50* (2013.01); *B60R 2300/8066* (2013.01)

(58) Field of Classification Search
CPC ........ H04N 7/183; H04N 5/2251; H04N 7/18; H04N 5/2252; H04N 5/2253; H04N 5/2254; H04N 5/23293; H04N 7/185; H04N 7/188; H04N 17/002; H04N 5/2257; H04N 5/2258; H04N 5/2259; H04N 5/23206; H04N 5/23238; H04N 5/23248; H04N 5/247; H04N 5/2628; H04N 5/33; H04N 5/3415; H04N 7/181
See application file for complete search history.

(56) References Cited

U.S. PATENT DOCUMENTS

| | | | |
|---|---|---|---|
| 2007/0126564 A1* | 6/2007 | Lee ..................... | B60Q 9/005 340/435 |
| 2016/0014206 A1* | 1/2016 | Isobe ................. | H04W 4/046 455/557 |
| 2016/0152211 A1* | 6/2016 | Owens ............... | B60R 25/102 348/36 |
| 2017/0104865 A1* | 4/2017 | Skelton ............ | H04M 1/72569 |
| 2017/0111863 A1* | 4/2017 | Kochery ........... | H04W 52/0229 |
| 2018/0194323 A1* | 7/2018 | Woodill, Jr. ......... | H04W 12/00 |
| 2018/0343141 A1* | 11/2018 | Scalisi ............... | H04L 12/2823 |

* cited by examiner

*Primary Examiner* — Samira Monshi

(57) ABSTRACT

A method may include detecting, by a mobile device, a first signal transmitted from a mobile device mount located in a vehicle and transmitting, by the mobile device and in response to detecting the first signal, a second signal to a vehicle system interface device. The method may also include sending, by the vehicle system interface device and in response to receiving the second signal, a third signal to a camera configured to capture video data associated with objects located at least one of behind or to the side of the vehicle and transmitting video data by the camera, in response to receiving the third signal. The method further includes receiving, by the mobile device, the video data transmitted by the camera and automatically displaying, by the mobile device, the received video data.

20 Claims, 7 Drawing Sheets

SYSTEMS AND METHODS FOR STREAMING VIDEO FROM A REAR VIEW BACKUP CAMERA

BACKGROUND INFORMATION

Vehicles are often equipped with pre-installed rear view cameras. The camera is typically activated when the driver of the vehicle puts the vehicle into reverse and begins backing up. However, there is usually a delay between the time that the vehicle begins backing up and when the output of the camera is displayed via the screen typically located on the dashboard of the vehicle. As a result, the driver is often unaware of what is behind the vehicle when he/she begins backing up.

In addition, not all vehicles have factory installed rear view cameras. As a result, the vehicle operator is often unable to clearly see behind the vehicle when backing up, especially in bad weather, such as when it is raining, or cold weather when frost covers the rear window of the vehicle.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to initiating and streaming video from a rear view camera to a vehicle operator. In an exemplary implementation, a rear view camera may be retrofitted to an existing vehicle and the vehicle operator may use a mobile device to display live video streaming from the rear view camera. The mobile device and/or other vehicle systems may initiate or wake up the rear view camera prior to the driver actually placing the car in reverse. The camera may then begin wirelessly streaming live video. The mobile device may receive and display the live video. In this manner, the display of the live video does not lag the actual movement of the vehicle in reverse, thereby providing the driver with the rear view video in a timely manner.

Figure 1:
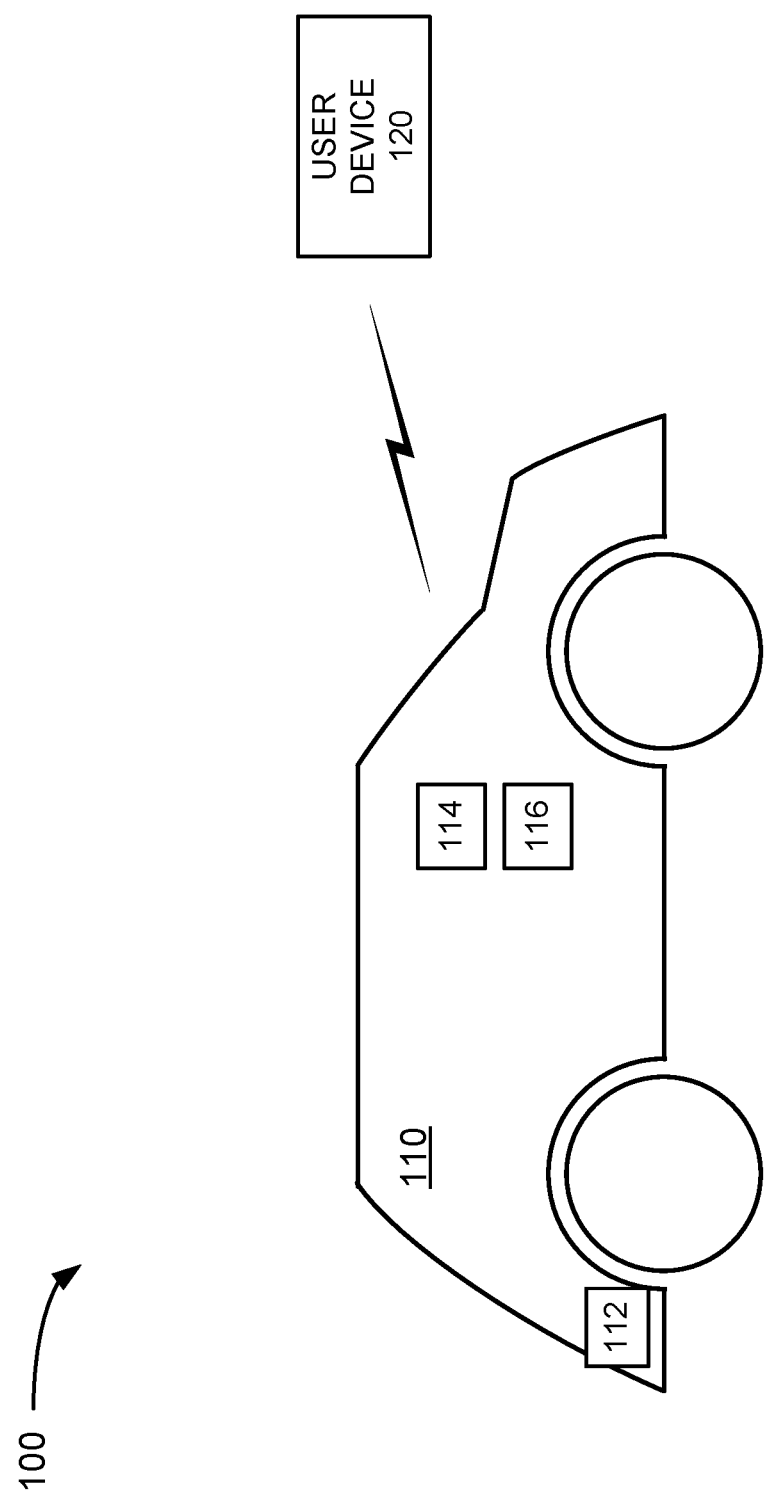
FIG. 1 illustrates an exemplary environment in which systems and methods described herein may be implemented.

FIG. 1 is a block diagram of an exemplary environment 100 in which systems and methods described herein may be implemented. Environment 100 includes vehicle 110 and user device 120.

Vehicle 110 may represent any vehicle, such as a car, truck, bus, recreational vehicle, motorcycle, farm equipment, boat, etc. In an exemplary implementation, vehicle 110 may include rear view camera 112, mobile device mount 114 and vehicle system interface 116.

Camera 112 may be a rear facing camera that captures live video and/or image data located behind and/or to the sides of vehicle 110. In one implementation, camera 112 may be retrofitted or added to an existing vehicle 110 via a license place mount (e.g., integrated into a frame surrounding the vehicle license plate), or a mount located elsewhere on the rear portion (e.g., bumper, back window, roof, sides, etc.) of vehicle 110. In other implementations, camera 112 may be installed by the manufacturer or car dealer when vehicle 110 is sold to a consumer. Camera 112 may also be battery powered and include wireless communication capability for communicating with other devices in environment 100, such as vehicle system interface 116 and user device 120.

Mobile device mount 114, also referred to as mobile device cradle or holder 114, may be a fixed structure mounted to the windshield, dashboard, dash pad, climate control vents, etc. of vehicle 110. Mobile device mount 114 may include, for example, a holder or cradle that can interface with one or more vehicle electronic systems (VESs) located within vehicle 110. Mobile device mount 114 may also transmit a signal, such as a beacon, at predetermined intervals that advertises its presence. The beacon may be transmitted using a known wireless technology, such as Bluetooth low energy (BLE). The beacon may be used by other devices in environment 100, such as user device 120 to determine that user device 120 is within the interior of vehicle 110/close to mobile device mount 114. In other implementations, mobile device mount 114 may include near field communication (NFC) logic and/or an NFC interface that enables user device 120 to detect the presence of mobile device mount 114 when mobile device 120 comes in close proximity (e.g., two inches to 12 inches) to mobile device mount 114. In some implementations, mobile device mount 114 may provide electrical power to user device 120 via vehicle 110's battery so that user device 120 may be charged (either inductively or through a physical connection) while mounted on or within mobile device mount 114.

Vehicle system interface 116 may interface with VESs within vehicle 100. For example, vehicle system interface 116 may include vehicle diagnostics and tracking logic that interfaces with vehicle monitoring systems, such as the speedometer, odometer, braking system, camera 112, etc. In one implementation, vehicle system interface 116 may include a dongle or other plug-in device that connects to a port on vehicle 110, such as an On-board Diagnostics (OBD)-II port, and includes diagnostic reader logic to obtain information regarding operation of vehicle 110, such as speed, location, etc. Vehicle system interface 116 may also include a wireless transceiver that interfaces with camera 112 and a software application executed by user device 120. For example, user device 120 may include a software application that allows user device 120 to display vehicle diagnostic or operational information received from vehicle system interface 116. The software application may also allow user device 120 to receive streaming video from camera 112, as described in detail below.

User device 120 may include a mobile device, such as wireless or cellular telephone device (e.g., a conventional cell phone with data processing capabilities), a smart phone, a personal digital assistant (PDA) that can include a radio-telephone, etc. In another implementation, user device 120 may include any type of mobile computer device or system, such as a personal computer (PC), a laptop, a tablet computer, a notebook, a netbook, a wearable computer (e.g., a wrist watch, eyeglasses, etc.), a game playing device, a music playing device, etc., that may include communication functionality. User device 120 may connect to devices in environment 100 (e.g., camera 112, mobile device mount 114, vehicle system interface 116, etc.) via any conventional technique, such as wired, wireless, optical connections or a combination of these techniques. User device 120 and the person associated with user device 120 (e.g., the party holding or using user device 120) may be referred to collectively as user device 120 in the description below.

In an exemplary implementation, user device 120 may receive data streams from camera 112 and/or one or more vehicle sensors. For example, user device 120 may be physically secured to mobile device mount 114 when vehicle 110 is moving so that the driver can interact with user device 120 in a hands-free manner. User device 120 may also establish connections with one or more VESs through vehicle system interface 116. For example, vehicle system interface 116 may provide the interface using physical connections to one or more VESs using industry standard interfaces and protocols.

Additional wireless interfaces may be used, for example, to facilitate the interface of user device 120 with vehicle 110 (e.g., camera 112, mobile device mount 114 and vehicle system interface 116). For example, the wireless channels may be supported by wireless technology standards, such as Bluetooth, BLE, ZigBee, WiFi, NFC, etc. The wireless interfaces may be used to exchange credentials for verification, trigger processes on user device 120, such as starting an application for viewing live video streams from camera 112, and/or prompt the user for operational preferences.

The exemplary environment illustrated in FIG. 1 is provided for simplicity. It should be understood that a typical environment may include more or fewer devices than illustrated in FIG. 1. For example, environment 100 may include several cameras 112 and/or additional sensors that provide streaming video, alerts and other information associated with operation of vehicle 110.

Various functions are described below as being performed by particular components in environment 100. In other implementations, various functions described as being performed by one device or component may be performed by another device or multiple other devices, and/or various functions described as being performed by multiple devices may be combined and performed by a single device.

Figure 2:
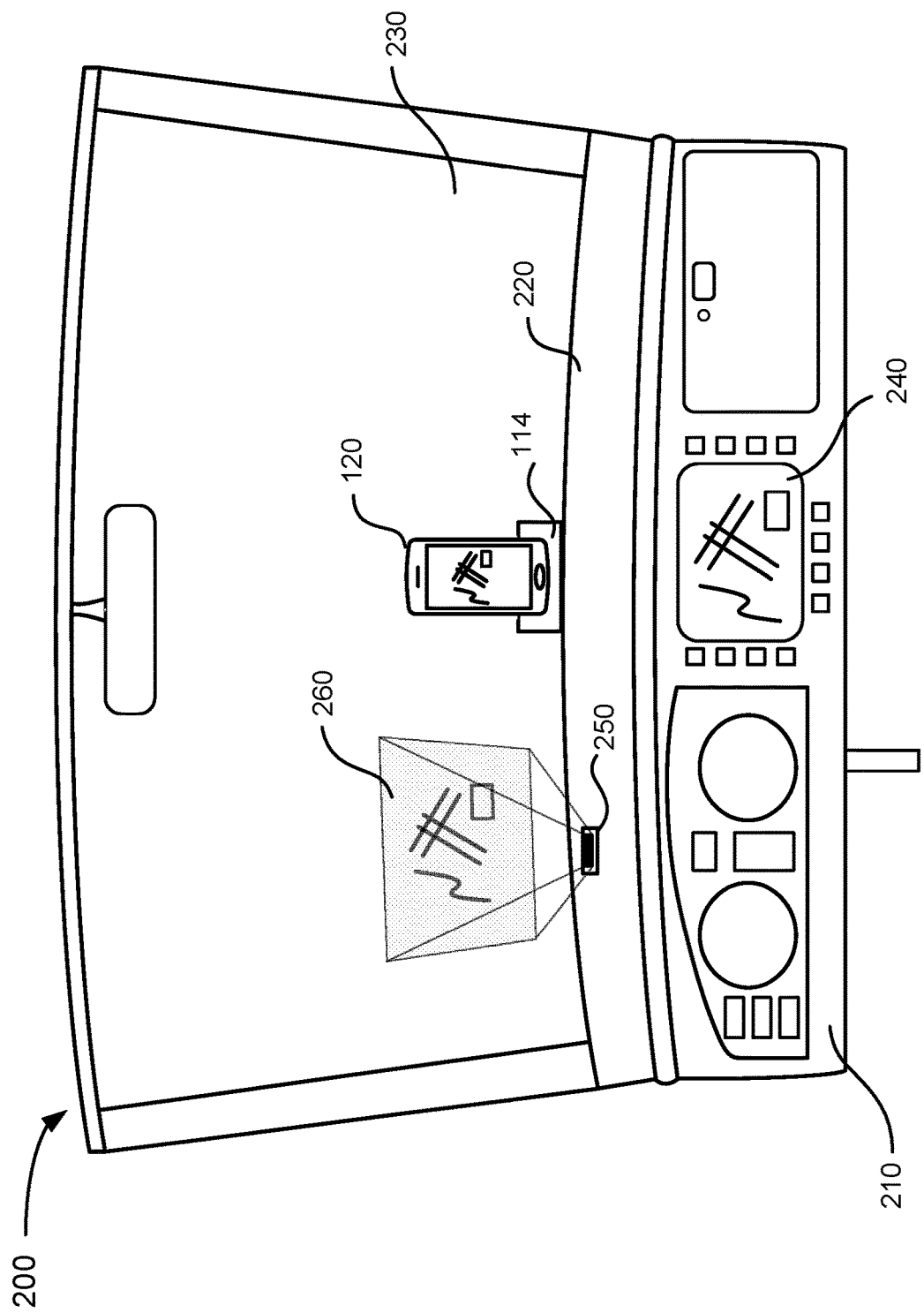
FIG. 2 illustrates an exemplary configuration of components implemented in the vehicle of FIG. 1.

FIG. 2 is an exemplary diagram illustrating an interior 200 of vehicle 110. The perspective shown in FIG. 2 is from the viewpoint of a front-seat occupant looking toward the front of vehicle 110. Vehicle interior 200 may include dashboard 210, dash pad 220, windshield 230, vehicle display 240 and heads-up display unit 250, as well as mobile device mount 114, vehicle system interface 116 and user device 120. Dashboard 210 may be located below dash pad 220 and may include gauges, vehicle display 240, etc. Vehicle display 240 may include a user interface, such as a touch screen liquid crystal display, which supports a map and/or user interface elements to permit a driver of vehicle 110 to obtain directions to locations of interest, tune to radio channels, set heat and air condition temperatures, etc. Alternatively or additionally, vehicle display 240 may receive voice inputs from a user (e.g., the driver), and use voice recognition to identify information to perform a particular command/action.

In the implementation illustrated in FIG. 2, mobile device mount 114 is mounted on dash pad 220. Mobile device mount 114 may be affixed to dash pad via an adhesive, Velcro, or some other type of attachment mechanism, such as clips, screws, etc. In other implementations, mobile device mount 114 may be mounted on windshield 230 via, for example, suction, or to another structure within vehicle interior 200, such as to air conditioning vents on vehicle 110 via clips.

Vehicle system interface 116 is illustrated as connected to vehicle systems at a location under dashboard 210 on the driver side of vehicle interior 200. For example, vehicle system interface 116 may be a dongle or other plug-in device that connects to an OBD-II port located under dashboard 210 on the driver side of vehicle 110. In other implementations, vehicle system interface 116 may be located closer to the passenger seat side of vehicle interior 200, based on the location, for example, of the OBD-II port in vehicle 110.

In some embodiments, vehicle interior 200 may include heads-up display (HUD) unit 250 that projects images and/or text on windshield 230 at area 260. For example, HUD unit 250 may project data at area/projection 260, such as vehicle speed, radio station information, directions/maps, etc. In another embodiment, the graphics display provided by vehicle display 240 may also be included in projection 260 generated by HUD unit 250. For example, HUD unit 250 may provide a display via projection 260 which includes a map and/or any other visual information generated by various vehicle systems. Projection 260 may appear to the driver as a translucent image of a relatively small size and character as to not distract the driver from seeing out of windshield 230.

User device 120 is illustrated in FIG. 2 as being attached to mobile device mount 114. This allows the driver to interact with user device 120 in a hands-free mode. User device 120 may be easily inserted and removed from mobile device mount 114.

Although FIG. 2 shows exemplary components of vehicle interior 200, in other implementations, vehicle interior 200 may include fewer components, different components, differently arranged components, or additional components than depicted in FIG. 2. For example, one or more components of vehicle interior 200 may perform functions described as being performed by one or more other components. In addition, in some implementations, the elements illustrated in FIG. 2 may be modules executed by a single computing device, system or platform that performs the processes described below.

Figure 3:
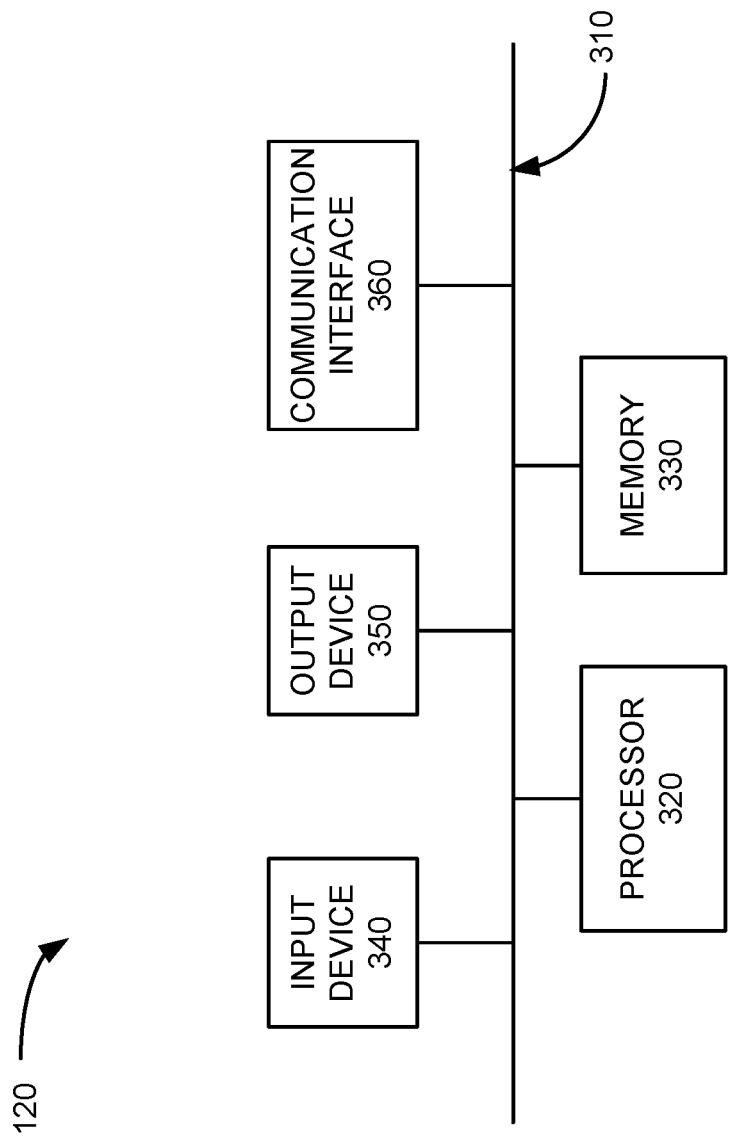
FIG. 3 illustrates an exemplary configuration of logic components included in one or more of the devices of FIGS. 1 and 2.

FIG. 3 illustrates an exemplary configuration of user device 120. Other devices in environment 100, such as camera 112, mobile device mount 114 and/or vehicle system interface 116 may be configured in a similar manner. Referring to FIG. 3, user device 120 may include bus 310, processor 320, memory 330, input device 340, output device 350 and communication interface 360. Bus 310 may include a path that permits communication among the elements of user device 120.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SSD). Memory 330 may also include a magnetic and/or optical recording medium (e.g., a hard disk) and its corresponding drive.

Input device 340 may include a mechanism that permits a user to input information, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, user device 120 may include a touch screen display may act as both an input device 340 and an output device 350.

Communication interface 360 may include one or more transceivers that user device 120 (or other elements in FIGS. 1 and 2) uses to communicate with other devices via wired, wireless or optical mechanisms. For example, communication interface 360 may include one or more radio frequency (RF) transmitters, receivers and/or transceivers and one or more antennas for transmitting and receiving RF data. Communication interface 360 may also include a modem or an Ethernet interface to a LAN or other mechanisms for communicating with elements in a network. Communication interface 360 may further include NFC logic configured to detect devices located within a close proximity to user device 120. For example, communication interface 360 may include NFC logic and a wireless interface to detect an RF field generated by mobile device mount 114.

The exemplary configuration illustrated in FIG. 3 is provided for simplicity. It should be understood that user device 120 (or camera 112, mobile device mount 114, vehicle system interface 116) may include more or fewer devices than illustrated in FIG. 3. In an exemplary implementation, user device 120 (or other device in environment 100 or FIG. 2) performs operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
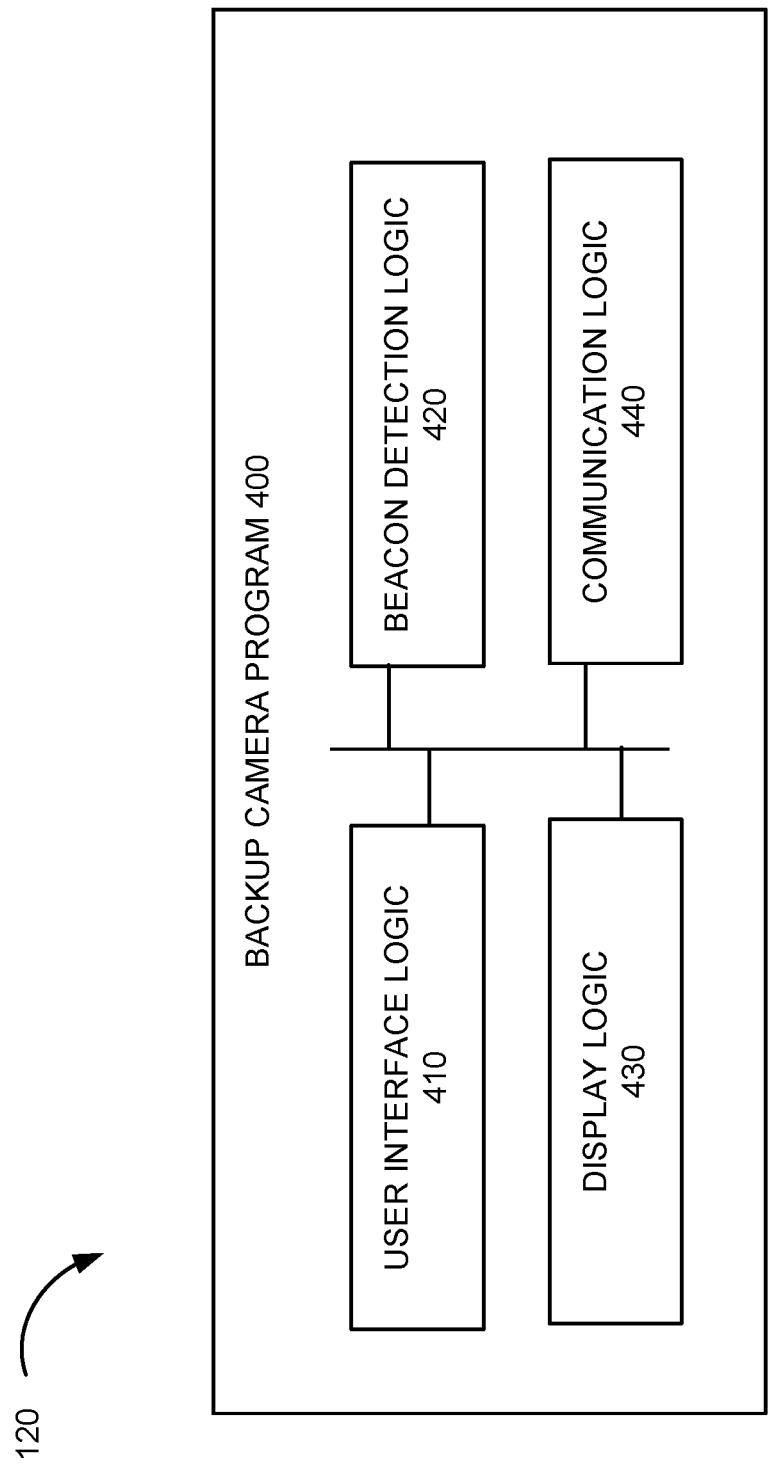
FIG. 4 illustrates an exemplary configuration of logic components implemented in the user device of FIG. 1.

FIG. 4 is an exemplary functional block diagram of components implemented in user device 120 of FIG. 1. Referring to FIG. 4, backup camera program 400 may be an application program associated with activating camera 112 and streaming video from camera 112 to user device 120. Backup camera program 400 may include software instructions executed by processor 320 stored in memory 330 of user device 120. In alternative implementations, these components or a portion of these components may be located externally with respect to user device 120.

Backup camera program 400 may include user interface logic 410, beacon detection logic 420, display logic 430 and communication logic 440. User interface logic 410 may include logic to facilitate launching application 400. For example, user interface logic 410 may include a graphical user interface (GUI) that allows a user to instruct backup camera program 400 to operate as a background process while user device 120 is turned on. In other implementations, a user may select to automatically execute backup camera program 400 when he/she is getting close to vehicle 120. In this case, backup camera program 400 may communicate with vehicle system interface 116 when user device 120 is brought within relatively close proximity (e.g., 10 feet, 20 feet etc.) to vehicle 110. In some implementations, backup camera program 400 may be part of a larger program that allows user device 120 to interface with vehicle system interface 116 to obtain and display information of interest regarding operation of vehicle 110, such as speed information, vehicle location tracking information, hard acceleration and braking information, etc. User interface logic 410 may also include speech recognition logic to allow backup camera program 400 to respond to voice prompts from the user.

Beacon detection logic 420 may include logic that searches/scans for a beacon from mobile device mount 114. For example, as discussed above, mobile device mount 114 may output a beacon, such as Bluetooth low energy (BLE) beacon. Beacon detection logic 420 may include a transceiver that detects the beacon transmitted by mobile device mount 114 when user device 120 is within a relatively close proximity, such as two feet or less (e.g., six inches or less) from mobile device mount 114. In other implementations, backup camera program 400 may include NFC logic that detects when user device 120 is within relatively close proximity (e.g., two feet or less) to mobile device mount 114. In this case, mobile device mount 114 includes an NFC logic/interface that allows user device 120 to detect mobile device mount 114, or vice versa.

Display logic 430 may output information to the display of user device 120 (e.g., output device 350), which may include an LCD. In an exemplary implementation, display logic 430 may receive streaming live video information from camera 112 and output the live video information to the display of user device 120. Display logic 430 may also display warnings, such as text or flashing icons, to indicate that the vehicle 110 is close to some other device, such as another car, tree, or other potential obstructions. Display logic 430 may further include logic to provide voice information or other audible information, such as alerts, to user device 120.

Communication logic 440 may include logic for communicating with other devices in environment 100. For example, communication logic 440 may receive and/or transmit information from and/or to camera 112 and forward the video to display logic 430. Communication logic 440 may also transmit and/or receive information to/from mobile device mount 114 and vehicle system interface 116, etc., as described below. Communication logic 440 may further include logic to provide voice information or other audible information, such as alerts, to user device 120.

Although FIG. 4 shows exemplary components of backup camera program 400, in other implementations, backup camera program 400 may include fewer components, different components, differently arranged components, or additional components than depicted in FIG. 4. For example, as described above, backup camera program 400 may be part of a larger program that allows user device 120 to interface with vehicle system interface 116 to obtain and display information of interest regarding operation of vehicle 110. In addition, functions described as being performed by one or more of the components in FIG. 4 may alternatively be performed by another one or more of the components of backup camera program 400.

Figure 5:
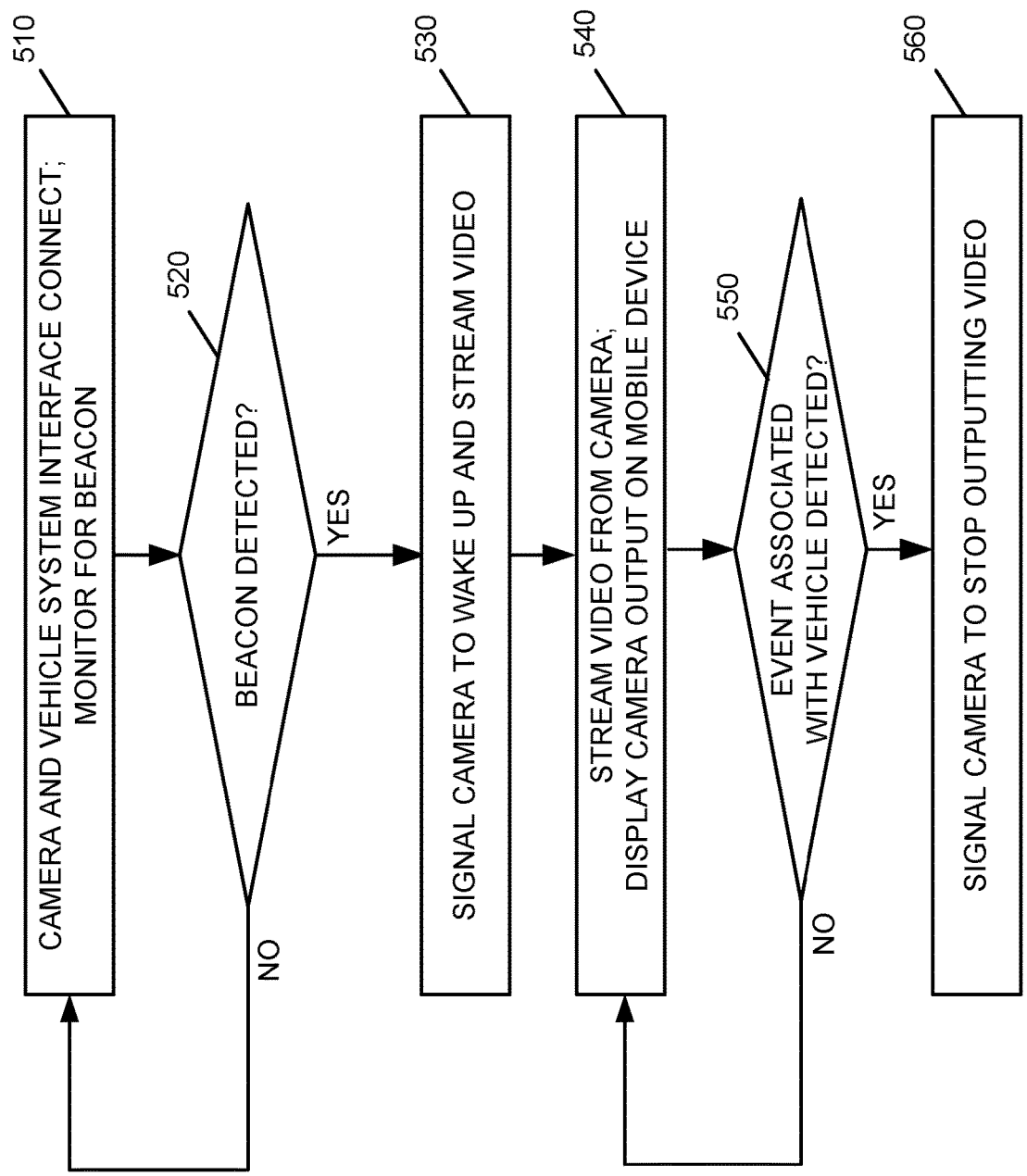
FIG. 5 is a flow diagram illustrating processing by various components illustrated in FIGS. 1 and 2 in accordance with an exemplary implementation.
Figure 6:
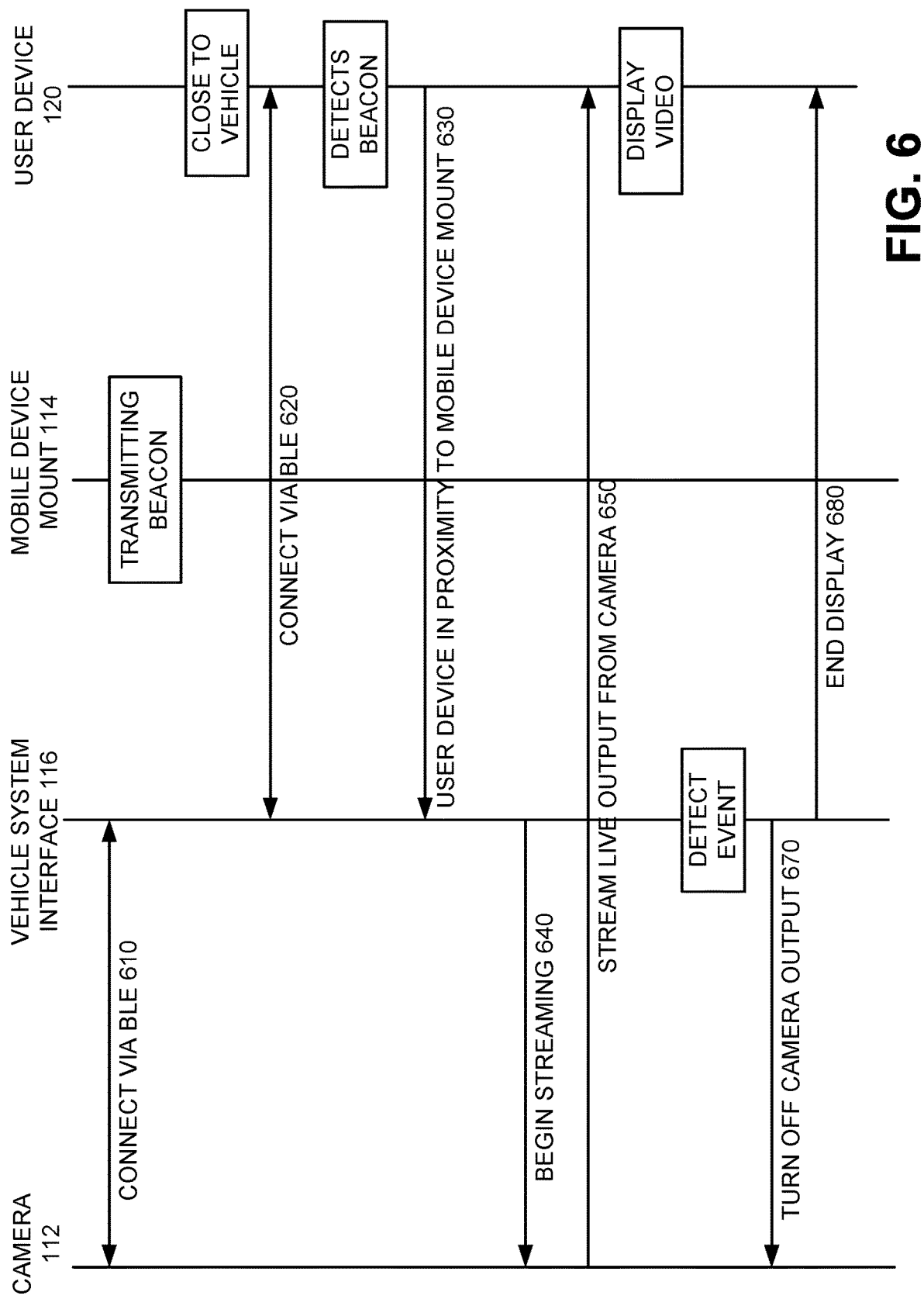
FIG. 6 is a signal flow diagram associated with the processing of FIG. 5.

FIG. 5 is a flow diagram illustrating processing associated with elements of environment 100. The flow diagram of FIG. 5 is described in conjunction with the signal flow diagram of FIG. 6. Processing may begin with camera 112 and vehicle system interface 116 connecting with each other. For example, both camera 112 and vehicle system interface 116 may wirelessly communicate with each other via BLE or some other wireless protocol and may form a connection (block 510; FIG. 6, 610). In an exemplary implementation, camera 112 may go into a "sleep" mode once the connection with vehicle system interface 116 has been established to save battery power for camera 112. In some implementations, camera 112 and vehicle system interface 116 may periodically exchange messages to maintain the connection and ensure that the communication link is viable and/or verify that camera 112 and vehicle system interface 116 are both operating properly.

Mobile device mount 114, as described above, may transmit a beacon signal every predetermined period of time (e.g., every one second, two seconds, five seconds, etc.). The beacon signal may be used to advertise the existence of mobile device mount 114 and may be used by user device 120 to establish a connection with mobile device mount 114 and/or determine that user device 120 is located within the interior 200 of vehicle 110 and in close proximity to mobile device mount 114. For example, assume that user device 120 includes backup camera program 400. Further assume that the user has launched backup camera program 400 and that backup camera program 400 is operating as a background process in user device 120 to automatically monitor for detection of the beacon provided by mobile device mount 114 (block 510). For example, beacon detection logic 420 may continuously or periodically operate to attempt to detect a beacon associated with mobile device mount 114. In other implementations, beacon detection logic 420 may not operate until backup camera program 400 has linked with vehicle system interface 116.

For example, assume that user device 120 comes within relatively close proximity (e.g., 10 feet) of vehicle 110 when the user associated with user device 120 is walking toward his/her vehicle 110. Backup camera program 400 may connect with vehicle system interface 116. For example, communication logic 440 of backup camera program 400 may wirelessly connect with vehicle system interface 116 via BLE or some other wireless protocol when user device 120 comes within a relatively close range of vehicle system interface 116, such as 10 feet, 20 feet, etc. (FIG. 6, 620). In one implementation, vehicle system interface 116 may continuously or periodically operate to attempt to detect backup camera program 400 of user device 120 via BLE or some other wireless protocol to initiate the wireless connection to backup camera program 400.

Figure 7:
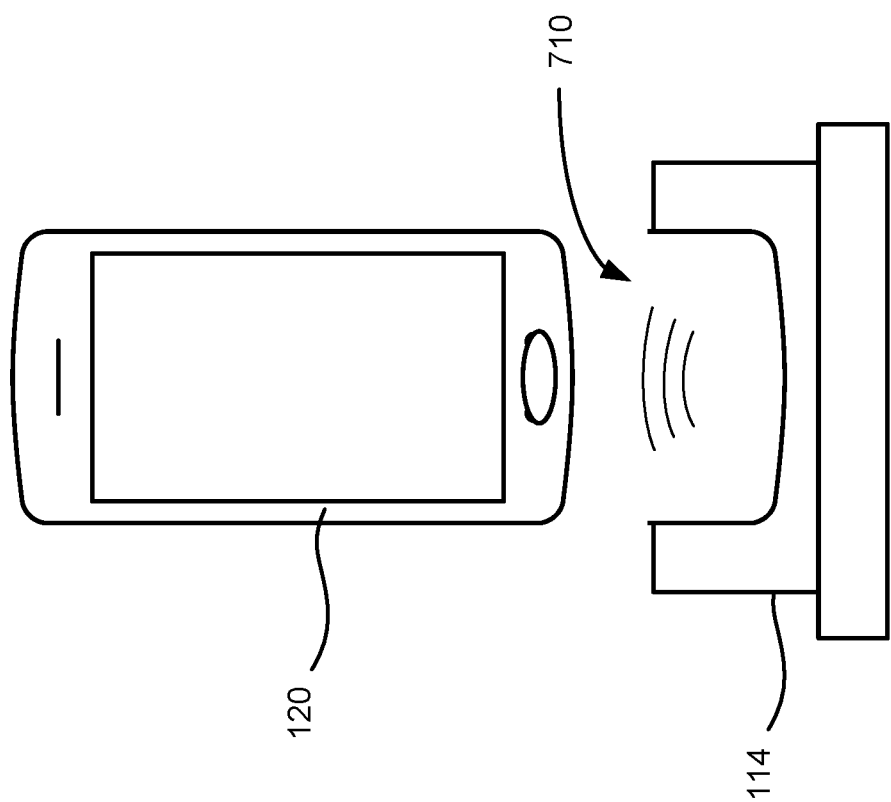
FIG. 7 illustrates detection of a wireless signal by the user device of FIG. 1.

As discussed above, beacon detection logic 420 may monitor for the beacon transmitted by mobile device mount 114 and determine whether the beacon is detected (block 520). If no beacon is detected (block 520—no), the monitoring continues. Assume that beacon detection logic 420 detects the beacon transmitted from mobile device mount 114 (block 520—yes). For example, referring to FIG. 7, assume that user device 120 is carried into very close proximity to mobile device mount 114, such as one foot or less (e.g., six inches). In this case, beacon detection logic 420 detects the low energy beacon identified by 710 in FIG. 7 transmitted by mobile device mount 114.

In this case, once beacon detection logic 420 detects the low energy beacon, backup camera program 400 signals vehicle system interface 116 that user device 120 is in very close proximity to mobile device mount 114 (FIG. 6, signal 630). Vehicle system interface 116 receives the signal and may then signal camera 112 to wake-up (if camera 112 is in a power saving sleep mode) or turn-on (if camera 112 is off) and begin streaming video (block 530; FIG. 6, signal 640).

Camera 112 receives the signal from vehicle system interface 116, wakes up and begins streaming live video output to user device 120 for display (block 540; FIG. 6, 650). For example, camera 112 may wireless stream the video output via WiFi or another wireless protocol/technology. Communication logic 440 receives the video data and forwards the video data to display logic 440, which outputs the live streaming video via the display of user device 120 (block 540). In this manner, streaming video from camera 112 is displayed on user device 120 before the driver of vehicle 120 places the car in reverse and begins backing up.

In some implementations, user device 120 may delay the display of the streaming video from camera 112 until user device 120 is physically coupled to mobile device mount 114 to ensure that the user device 120 is secured and the user can view the video in a hands-free manner. In another implementation, user device 120 may delay the display of the streaming video until the driver places vehicle 120 in reverse. This may avoid any display being output by user device 120 when the driver is pulling forward and not backing up. In each case, there is no lag between the time that vehicle 120 begins backing up and the output from camera 112 being displayed via user device 120.

Assume that vehicle 120 is placed in reverse and is moving in the backward direction. In this case, the user of user device 120 (i.e., the driver of vehicle 110) may simply look at the output screen of user device 120 located in mobile device mount 114 to view the area behind and/or to the sides of vehicle 120 while he/she is backing up.

Vehicle system interface 116 may monitor for an event associated with the operation of vehicle 120 (block 550). For example, vehicle system interface 116 may monitor the movement of vehicle 120 to determine whether vehicle 120 is moving forward, whether vehicle 120 has been placed in park or whether vehicle 120 has been placed in drive or first gear. If vehicle system interface 116 does not detect one of the predetermined events (block 550—no), vehicle system interface 116 continues to monitor, and camera 112 continues to stream live video to user device 120, which is automatically displayed on the output screen of user device 120.

Assume that vehicle system interface 116 detects one of these predetermined events (block 550—yes). For example, assume that vehicle system interface 116 detects forward motion of vehicle 120 via an accelerometer or some other vehicle movement detection mechanism. Vehicle system interface 116 then signals camera 112 to stop outputting video (block 560; FIG. 6, signal 670). Camera 112 may then go into a sleep mode to conserve battery power. Vehicle system interface 116 may also signal user device 120 to stop the display of video from camera 112 (FIG. 6, signal 680). The output screen of user device 120 may then stop displaying the video and return to displaying the user's home screen for user device 120.

In the manner described above, vehicle 110 may be retrofitted with one or more cameras 112 that stream video to user device 120 to allow the driver to see behind vehicle 110 when vehicle 110 is backing up. In other implementations, camera 112 may interface with vehicle display 240 and/or HUD unit 250 to display output from camera on vehicle display 240 and/or HUD projection 260. In each case, when user device 120 comes in close proximity to mobile device mount 114, camera 112 may be triggered to wake up and begin streaming video. This allows video to be streamed to user device 120 without any lag or delay with respect to vehicle 120 moving in the backward direction.

Implementations described herein provide streaming video from a rear view camera to a vehicle operator. The rear view camera may be factory installed or retrofitted to an existing vehicle and the vehicle operator may use a mobile device to display live video from the rear view camera. In such cases, the rear view camera may stream live video to a driver's mobile device to provide live video in scenarios where the vehicle is not equipped with a vehicle display system. Still further, the video may be displayed prior to the driver placing the car in reverse and moving backward, thereby avoiding any lag between actually backing up and the output of the video on the mobile device.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to user device 120 detecting the presence of mobile device mount 114 to trigger the streaming of video from camera 112. In other implementations, vehicle system interface 116 may detect the presence of user device 120, or vice versa, to trigger the streaming of video from camera 112. In this case, no mobile device mount 114 with beaconing capability may be needed. In other implementations, an input button or switch may be included on mobile device mount 114 to trigger the streaming of video from camera 112 to user device 120 when user device 120 is placed in mobile device mount 114. In some instances, the switch may be automatically triggered when user device 120 is secured within mobile device mount 114. In other instances, the user may manually select/push the input button to trigger the streaming from camera 112.

In addition, camera 112 and/or backup camera program 400 may be equipped with identification logic to alert the driver of hazards when backing up. For example, user device 120 may determine that based on the current backward movement of vehicle 110 (angle information, distance information and/or speed information) that the vehicle 110 is approaching another vehicle or object, such as a wall in a parking garage. In this case, backup camera program 400 may output audible and/or visual warnings on user device 120 to indicate the potential hazard. For example, backup camera program 400 may provide a beeping sound or a voice indicating "obstruction in five feet," or visually output a warning via the display of user device 120, such as by flashing warning icons, symbols and/or text.

Still further, in some implementations, backup camera program 400 and/or vehicle system interface 116 may include predictive analysis logic that determines a likelihood that vehicle 110 will be placed into reverse before streaming video from camera 112. For example, vehicle system interface 116 may store information indicating that vehicle 110 was not placed in reverse before the vehicle was last parked and turned off. This may indicate that the driver pulled vehicle 110 into a parking space or garage with the front end first. In such cases, predictive analysis logic may determine that it is more likely than not that the driver will have to back vehicle 110 out of the parking space/garage when vehicle 110 is next started up. In this scenario, backup camera program 400 may stream video from camera 112 when user device 120 is placed in mobile device mount 114, as described above. However, if vehicle system interface 116 stores information indicating that the driver backed up vehicle 110 immediately before placing the vehicle in park and turning off the ignition, this may indicate that the driver backed vehicle 110 into a parking space. In this scenario, predictive analysis logic included in vehicle system interface 116 or backup camera program 400 may determine that it is more likely than not that the driver will not have to back vehicle 110 out of the parking space/garage when vehicle 110 is next started up. In this scenario, backup camera program 400 may not display video until vehicle 110 is actually placed into reverse. In this manner, vehicle system interface 116 and/or backup camera program 400 may avoid waking up camera 112 and using battery life of camera 112 when it is unlikely that the vehicle 110 will begin backing up when vehicle 110 is started up and moved. Using predictive analysis logic in this manner may also avoid distracting the driver with unnecessary rear view video when the driver enters vehicle 110 in scenarios where the driver will most likely not be backing up.

Other types of information may also be used by the predictive analysis logic to determine the likelihood of vehicle 110 being placed into reverse. For example, if a front facing camera or sensor within vehicle 110 determines that the front of vehicle 110 is facing a wall within a close proximity (e.g., 10 feet or less), the predictive analysis logic may determine that the likelihood that vehicle 110 will be placed in reverse after starting up is high. In this case, backup camera program 400 may stream video from camera 112 when user device 120 is placed in mobile device mount 114, as described above.

Still further, vehicle system interface 116 may store information indicating the driver's history with respect to moving vehicle 110 from particular places. For example, if a user parks at a particular location (e.g., home, work, etc.) that is tracked by a global positioning system (GPS) within vehicle 110, vehicle system interface 116 may store information indicating whether the driver placed vehicle 110 in reverse after vehicle 110 was started and moved from the particular location. This prior movement history of vehicle 110 may be used to determine whether to begin streaming video from camera 112 when user device 120 is placed in mobile device mount 114 when vehicle 110 is in that same particular location. In this manner, predictive analysis logic may be used to aid in determining whether to wake up camera 112 and stream video using one or more of stored information regarding movement history of vehicle 110, sensor information regarding the environment in which vehicle 110 is parked, geographic location information with respect to the location of vehicle 110, etc.

In addition, in some implementations, sensors located to the sides of vehicle 110 may be used to detect other vehicles located in the driver's blind spot when the user is driving or stationary. In this case, user device 120 may receive alerts of other vehicles located in the blind spots when vehicle 110 is changing lanes. Such alerts may be audibly output via user device 120, such as by a beeping sound or a voice indicating "car in blind spot on the left," or visually output via the display of user device 120, such as by flashing warning icons, symbols and/or text.

Further, while series of acts have been described with respect to FIG. 5 and signal flows with respect to FIG. 6, the order of the acts and/or signal flows may be different in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
   detecting, by a mobile device, a first signal transmitted from a mobile device mount located in a vehicle, wherein the first signal corresponds to a beacon signal periodically transmitted by the mobile device mount;
   establishing a wireless connection between the mobile device and a vehicle system interface device when the mobile device is located within a first wireless range of the vehicle system interface device, wherein the vehicle system interface connects to an on-board diagnostics port located within the vehicle;
   transmitting, by the mobile device and in response to detecting the first signal, a second signal to the vehicle system interface device, wherein the vehicle system interface is not included in the mobile device mount;
   sending, by the vehicle system interface device and in response to receiving the second signal, a third signal to a camera configured to capture video data associated with objects located at least one of behind or to a side of the vehicle, wherein the third signal comprises a wake-up signal to wake-up or turn on the camera;
   wirelessly transmitting video data by the camera, in response to receiving the third signal;
   receiving, by the mobile device, the video data wirelessly transmitted by the camera; and
   automatically displaying, by the mobile device, the received video data.

2. The method of claim 1, wherein the sending a third signal comprises:
   determining, by the vehicle system interface device, that the vehicle has been placed in reverse before transmitting the third signal.

3. The method of claim 1, wherein the wireless connection comprises a Bluetooth connection.

4. The method of claim 1, further comprising:
   detecting an event associated with operation of the vehicle; and
   signaling the camera to stop transmitting video data in response to the detecting the event.

5. The method of claim 4, wherein the detecting an event comprises at least one of:
   detecting that the vehicle is moving forward,
   detecting that the vehicle has been placed in park,
   detecting that the vehicle has been placed in drive, or
   detecting that the vehicle has been placed in first gear.

6. The method of claim 1, wherein the detecting a first signal comprises:
   detecting a Bluetooth beacon transmitted by the mobile device mount.

7. The method of claim 6, wherein the detecting the first signal further comprises:
   detecting the Bluetooth beacon using a software application executed by the mobile device.

8. The method of claim 1, wherein the detecting a first signal comprises:
   detecting the first signal using near field communication.

9. The method of claim 1, wherein the detecting a first signal comprises:
   detecting the first signal prior to the mobile device being physically coupled to the mobile device mount.

10. A system, comprising:
    a camera configured to capture video data associated with objects located at least one of behind or to a side of a vehicle;
    a mobile device mount configured to:
      transmit a first signal at periodic intervals, wherein the first signal advertises the presence of the mobile device mount located within an interior of the vehicle; and
    a vehicle system interface device configured to:
      connect to an on-board diagnostic port of the vehicle,
      establish a wireless connection with a mobile device when the mobile device is located within a first wireless range of the vehicle system interface device,
      receive, from the mobile device and in response to the mobile device detecting the first signal, a second signal indicating that the mobile device is located within the interior of the vehicle,
      transmit, in response to receiving the second signal, a third signal to the camera, wherein the third signal comprises a wake-up signal to wake-up or turn on the camera, and
      transmit, to the mobile device and in response to receiving the third signal, video data by the camera, wherein the vehicle system interface device is not part of the mobile device mount.

11. The system of claim 10, wherein the vehicle system interface device is configured to:
    determine that the vehicle has been placed in reverse before transmitting the third signal.

12. The system of claim 10, wherein when establishing a wireless connection with the mobile device, the vehicle system interface device is configured to:
    establish the wireless connection with the mobile device when the mobile device is located within a first wireless range of the vehicle system interface device.

13. The system of claim 10, wherein the vehicle system interface device is further configured to:
    detect an event associated with operation of the vehicle, and
    signal the camera to stop transmitting video data in response to the detecting the event.

14. The system of claim 13, wherein when detecting an event, the vehicle system interface device is configured to:
    detect that the vehicle is moving forward,
    detect that the vehicle has been placed in park,
    detect that the vehicle has been placed in drive, or
    detect that the vehicle has been placed in first gear.

15. The system of claim 10, wherein the vehicle system interface device is configured to communicate with a software application executed by the mobile device.

16. A non-transitory computer-readable medium having stored thereon sequences of instructions which, when executed by at least one processor, cause the at least one processor to:
 detect a first signal periodically transmitted from a mobile device mount located in a vehicle;
 transmit, in response to detecting the first signal, a second signal to a vehicle system interface device coupled to an on-board diagnostic port of the vehicle, wherein the vehicle system interface device is configured to signal a camera to wake-up or turn on, in response to receiving the second signal, and to capture video data associated with objects located at least one of behind or to a side of the vehicle, and
 wherein the vehicle system interface device is not part of the mobile device mount;
 receive video data transmitted by the camera; and
 automatically display the received video data.

17. The non-transitory computer-readable medium of 16, wherein the non-transitory computer-readable medium is stored in a mobile device, and wherein the instructions further cause the at least one processor to:
 establish a wireless connection with the vehicle system interface device when the mobile device is located within a first wireless range of the vehicle system interface device.

18. The system of claim 10, wherein the vehicle system interface device is further configured to establish a wireless connection with the camera.

19. The system of claim 10, wherein when establishing a wireless connection with the mobile device, the vehicle system interface device is configured to establish a Bluetooth connection.

20. The non-transitory computer-readable medium of claim 17, wherein when establishing a wireless connection with the vehicle system interface device, the instructions cause the mobile device to establish a Bluetooth connection to the vehicle system interface device.

* * * * *